J. Creager,
Sawing Shingles,
Nº 17,026,
Patented Apr. 14, 1857.
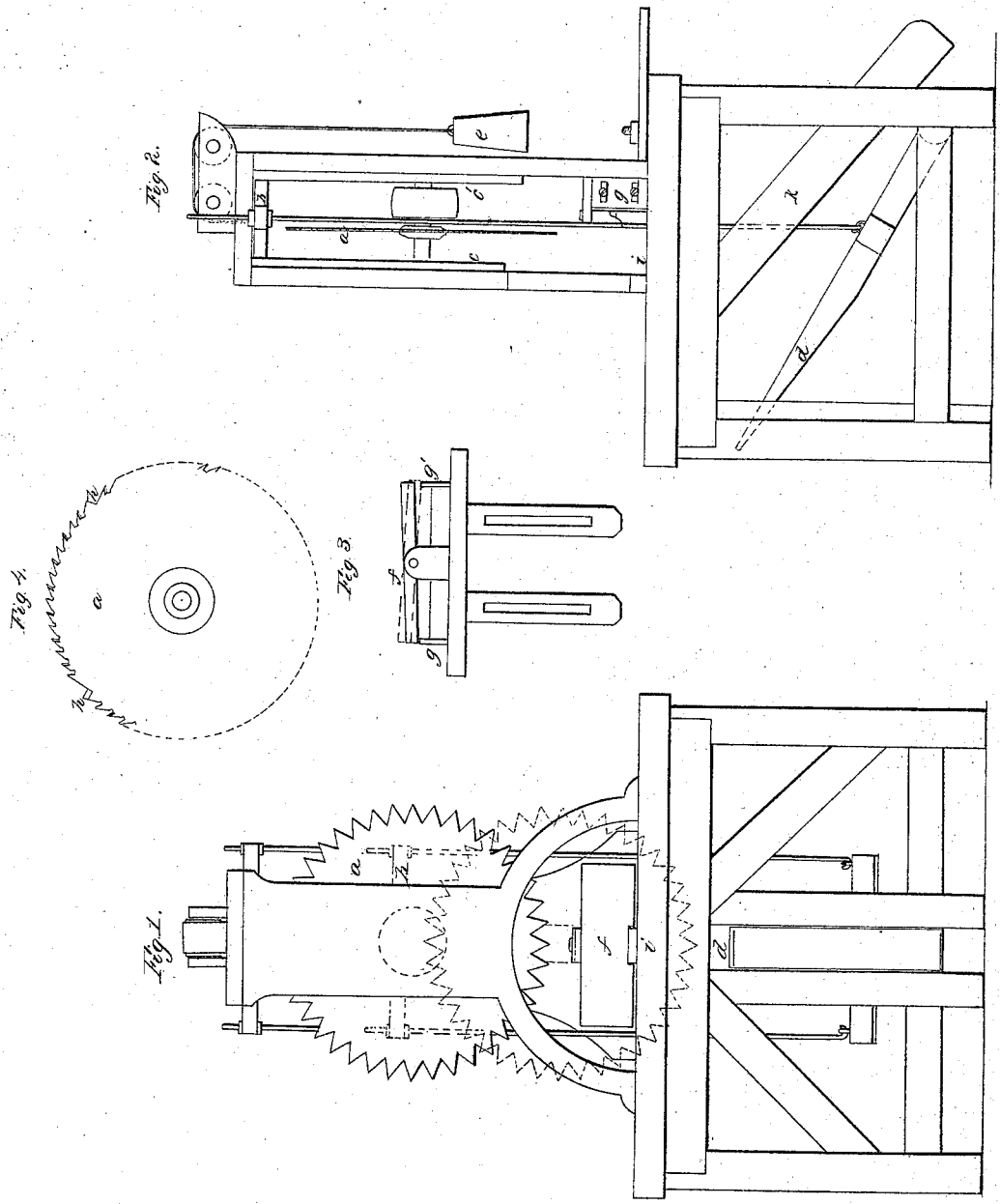

UNITED STATES PATENT OFFICE.

JONATHAN CREAGER, OF CINCINNATI, OHIO.

MACHINE FOR SAWING SHINGLES.

Specification of Letters Patent No. 17,026, dated April 14, 1857.

*To all whom it may concern:*

Be it known that I, JONATHAN CREAGER, of Cincinnati, Hamilton county, Ohio, have invented new and useful Improvements in Machines for Making Shingles; and I hereby declare the following to be a full and exact description thereof, reference being had to the accompanying drawings, making part of this specification.

The object of my invention is to provide a cheap, simple and portable machine, by means of which shingles may be manufactured with great facility and despatch in such manner as to require no subsequent dressing.

In the accompanying drawing, Figure 1 is a front view of the machine, Fig. 2 is an end view of the same, Fig. 3 is a top view of the adjustable rocking rest and parts connected therewith, and Fig. 4 a detached view of the saw exhibiting the form of the teeth.

($a$) is a circular saw driven by power and journaled in a gate ($b$) which slides up and down in vertical guides ($c$) ($c'$).

($d$) is a treadle by means of which the saw is depressed and a weight ($e$) or equivalent device restores it to its former position when the foot is withdrawn.

($f$) is my rocking rest furnished with adjustable stops ($g$) ($g'$) by means of which the vibrations of the rest are limited to any extent required.

At equal distances around the saw I form teeth ($h$) having chisel edges basiled alternately to the right and left. This construction of teeth and the ripping or longitudinal cut of the saw form a face of smooth finish and requiring no shaving.

The operation is as follows. The stops ($g$) ($g'$) are first advanced so as to hold the rest ($f$) stationary in a position exactly parallel with the saw. A block, in length equal to a shingle, and with its upper and under surfaces squared so that its perpendicular thickness will be equal to the desired width of a shingle, is then placed on the bench ($i$) with its cloven face against the rest ($f$). The saw being then depressed by the treadle ($d$) a slab is separated leaving a smooth face precisely coinciding with the grain of the timber. The stops ($g$) ($g'$) being then retracted to admit of the rocking of the rest to an extent equal to the necessary taper of the shingles, an intermittent rocking motion is by the pressure alternately of the right and left hands of the operator imparted to the block, which results at each depression of the saw, in the separation of a shingle having invariably one face which is perfectly straight with the grain; said face being intended to be turned up to the weather. By this plan no reversion of the block becomes necessary. The shingles as fast as formed are conducted off by a spout ($k$).

What I claim as new and desire to secure by Letters Patent is—

The combination of the bench ($i$) rocking rest ($f$) and adjustable stops ($g$) ($g'$), with circular saw fed transversely of the shingle by treadle and cutting longitudinally, when arranged and operating in the manner substantially as and for the purposes described.

In testimony of which invention I hereunto set my hand.

JONATHAN CREAGER.

Attest:
GEO. H. KNIGHT,
JAS. H. GRIDLEY.